United States Patent
Benischke et al.

(10) Patent No.: US 7,841,265 B2
(45) Date of Patent: Nov. 30, 2010

(54) METHOD FOR CUTTING OFF GLASS PANES FROM A CONTINUOUSLY PRODUCED GLASS SHEET

(75) Inventors: Peter Benischke, Bodenheim (DE); Klaus-Peter Lexow, Woerrstadt (DE); Axel Werner, Mainz (DE)

(73) Assignee: Schott AG, Mainz (DE)

( * ) Notice: Subject to any disclaimer, the term of this patent is extended or adjusted under 35 U.S.C. 154(b) by 1581 days.

(21) Appl. No.: 10/895,220

(22) Filed: Jul. 20, 2004

(65) Prior Publication Data
US 2005/0023337 A1    Feb. 3, 2005

(30) Foreign Application Priority Data
Aug. 1, 2003    (DE)    ................... 103 35 247

(51) Int. Cl.
*B26D 3/00*    (2006.01)
*B26D 5/00*    (2006.01)

(52) U.S. Cl. .................. 83/13; 83/75.5; 83/23; 83/39

(58) Field of Classification Search ............ 83/75.5, 83/13, 23, 39, 42, 880, 289, 295, 365, 371, 83/73; 225/96.5
See application file for complete search history.

(56) References Cited
U.S. PATENT DOCUMENTS
3,190,518 A * 6/1965 Insolio ................ 225/96.5

3,191,857 A    6/1965  Galey et al. .................. 234/3
3,352,015 A    11/1967 Galabert et al. ............. 33/32.3
3,490,320 A *  1/1970  Valembois et al. ............ 83/39
3,503,290 A *  3/1970  Valembois et al. ............ 83/23
6,202,524 B1 * 3/2001  Cunningham .................. 83/13

FOREIGN PATENT DOCUMENTS

| JP | 51-37112   |   | 3/1976 |
| JP | 3-88737    | * | 4/1991 |
| JP | 2004-083321 |  | 3/2004 |

OTHER PUBLICATIONS

Patent Abstracts of Japan 03088737 A of Apr. 15, 1991.
Patent Abstracts of Japan 04342432 A of Nov. 27, 1992.

* cited by examiner

*Primary Examiner*—Ghassem Alie
(74) *Attorney, Agent, or Firm*—Michael J. Striker

(57) ABSTRACT

The method includes continuously detecting glass faults in the glass sheet. Based on the results of the detecting of the glass faults an optimized cutting pattern for cutting crosscut pieces from a predetermined sheet section and for cutting glass panes from the crosscut pieces is determined. In order to reduce waste, the cutting lines for the glass panes are placed sufficiently close to fault-containing glass sheet regions, so that the glass sheet regions to be discarded are minimized, while producing a largest possible number of usable glass panes. The crosscut pieces are then cut out according to the optimized cutting pattern and then the glass panes are cut from the crosscut pieces. An appropriate apparatus for performing the method is described.

1 Claim, 5 Drawing Sheets

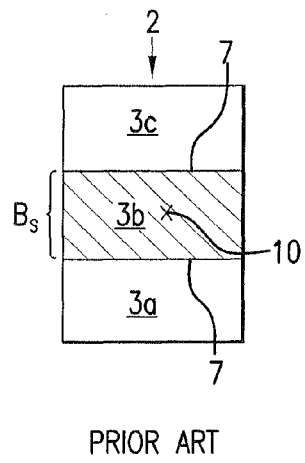
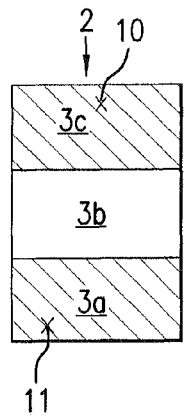
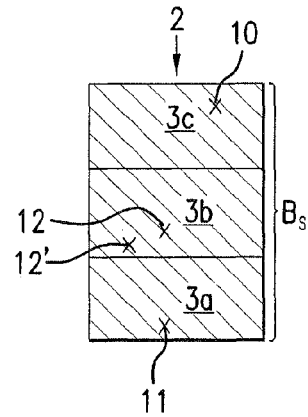
PRIOR ART
FIG.2a
PRIOR ART
FIG.2b
PRIOR ART
FIG.2c
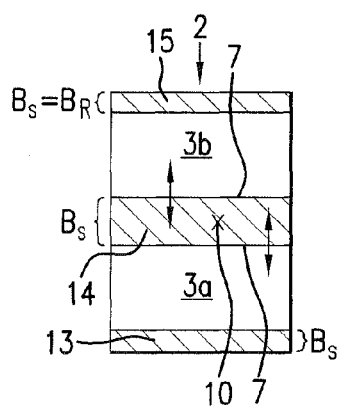
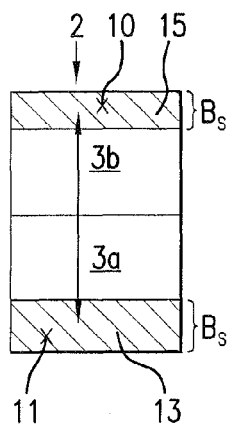
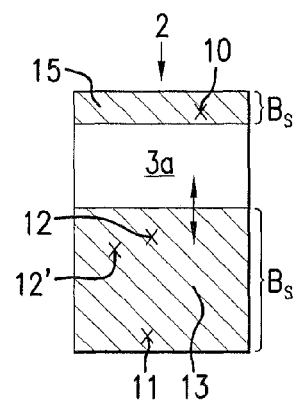
FIG.3a
FIG.3b
FIG.3c

METHOD FOR CUTTING OFF GLASS PANES FROM A CONTINUOUSLY PRODUCED GLASS SHEET

BACKGROUND OF THE INVENTION

1. Field of the Invention

The present invention relates to a method of cutting off glass panes or panels, especially rectangular glass panes or panels, from a continuously produced glass sheet, in which the glass sheet is continuously tested for glass faults prior to the cutting process, the glass sheet regions containing the glass faults or defects are determined and from the results of the fault detection an optimized cutting pattern for a given glass sheet section is determined by using a cutting optimizing device. The cutting pattern comprises a plan for cutting the glass panes or panels of respective predetermined sizes arranged next to each other in crosscut pieces out of the crosscut pieces.

The invention also relates to an apparatus for cutting off the glass panes from the glass sheet including a conveying device for the glass sheet and for the crosscut pieces cut from it, a fault detecting device for detecting faults in the glass sheet, a crosscutting device for cutting off crosscut pieces, a glass pane cutting device and a cutting optimization device connected to the fault detecting device, the crosscutting device and the glass pane cutting device. The cutting optimization device comprises means for calculating an optimized cutting pattern for a given glass sheet section.

2. Description of the Related Art

During glass pane manufacture, especially during manufacture of display glass, a glass sheet is continuously produced, so-called crosscut pieces are cut off in further process steps, glass borders of the crosscut pieces are removed and the glass panes are cut to the desired size from the crosscut pieces. The "crosscut pieces" by definition are glass sheet strips with borders extending perpendicular to the feed direction of the glass sheet, from which one or more useful glass panes are cut away.

Prior to cutting off the glass panes a fault detection process for detecting faults in the glass sheet is performed so that the regions, which are not acceptable because of either the number and/or type of faults or defects, can be located. During the determination of the cutting pattern, which provides a surface-covering glass pane arrangement, the fault information is considered so that as small-sized glass panes as possible contain the fault-containing glass sheet regions to be discarded, whereby the available glass sheet regions are cut out without gaps. The cutting pattern is designed so that the glass panes in the crosscut pieces are next to each other without gaps, so that the respective glass pane size defines the crosscut piece length. The crosscut pieces are placed next to each other without gaps. Since there are no strip-like waste regions between the crosscut pieces, which contain faults, they must be sorted out.

After the cutting process finished glass which contain the faults must be separated from the good glass panes.

When the batch permits the making of small-sized glass panes, the waste occurring in the known method can be decreased within certain limits. However in a batch from which only large-sized glass panes are made, these large panes thus must be sorted out, when only small regions have unacceptable faults within the glass panes.

Additional waste can arise when a border at the edge region is damaged during the cutting process. Also in this case the entire adjacent glass pane next to the border must be discarded.

SUMMARY OF THE INVENTION

It is an object of the present invention to provide a method and apparatus for cutting off glass panes from a continuously produced glass sheet, which provides a higher yield, particularly of good quality glass panes without glass faults.

This objects is attained with a method, in which the cutting lines for the glass panes to be cut off within each crosscut piece are placed close to the fault-containing glass sheet regions to be discarded, so that the widths of the glass sheet regions to be discarded are minimized while providing a largest possible number of usable glass panes.

The invention is founded on the understanding that the yield of usable glass panes can be increased, when, starting from a cutting pattern of the highest quality, based on an analysis of the fault type and/or number, the positions of the glass panes within the respective crosscut pieces are moved perpendicular to the feed direction of the glass sheet, taking the location of the faults into account, so that the size of the glass sheet regions to be discarded are minimized. A flexible cutting pattern is provided, which is adjusted to the faults present in the respective crosscut pieces.

The quality taking into account the types and/or number of faults and the pane sizes desired by the customer is determined anew for each batch.

Different quality or also a downgrading of quality can be taken into account during the determination of the optimized cutting pattern. This can mean, for example, that glass panes with different quality can be placed in one crosscut piece. Alternatively it can mean that glass panes, which can be arranged in one crosscut piece beside glass panes of lower quality, are stepped down, when a larger glass pane size can be obtained with an entirely higher quality.

The glass panes within a crosscut piece can contact each other. However it is also possible that a strip that should be discarded can arise between the glass panes because of a fault-containing region. So that a clean separation of this strip is possible, which depends on each cutting process, a minimum width of this strip to be discarded must be maintained, in order to prevent breakage or damage to the adjacent glass pane during the cutting away process.

Preferably the widths $B_S$ of the glass sheet region or regions to be thrown out or discarded are greater than or equal to a minimum allowable strip width $B_R$ of the glass sheet region to be discarded.

Preferably this minimum allowable strip width $B_R$ is fixed at greater than or equal to 100 mm. These widths $B_R$ are apparatus or equipment specific. The widths $B_R$ can take smaller values, when the plant or equipment or apparatus permits that.

Thickness fluctuations occur during glass sheet manufacture, which are preferably accounted for during the cutting optimization. A so-called good glass region is defined with the help of a similarly online measured thickness profile, which preferably is taken into account during calculation of the cutting pattern.

Preferably the glass fault detection is performed prior to cutting off of the borders, because the cutting off of the borders assumes that the crosscut piece size is established, which is determined by the cutting pattern. That means that the glass fault detection and the cutting pattern must be calculated before the crosscut pieces are cut away.

Preferably after cutting off the borders of the crosscut pieces an edge control process for finding edge faults can be performed. When the borders are cut off edge faults can be produced, so that the concerned adjacent glass panes must be separated after the conventional cutting pattern process.

According to the invention a so-called post-optimization process is performed, in which these edge faults are taken into account during calculation of the cutting pattern.

It is possible to again determine the cutting pattern with the help of the fault information from the edge control process and to calculate a further optimized cutting pattern, which is however connected with a considerable computational effort and corresponding time delay.

However basically there are only four variants for the results of the edge control process:

fault left fault right faults left and right no fault.

Because of the reduced number of possibilities the appropriate cutting pattern can preferably be made available or supplied already after the fault detection. Several cutting patterns are determined, in which a cutting line of at least one glass pane is placed at the edge of the good glass region or no cutting line is placed at the edge of the good glass region, so that a distance $B_R$ is maintained from the edge of the good glass region.

The appropriate cutting pattern is selected from the previously calculated cutting patterns determined according to the results of the edge control process, so that no time loss occurs during the cutting pattern determination at this point in the execution of the method.

The apparatus for cutting off the glass panes is characterized by a cutting optimization device for calculating or determining at least one cutting pattern for a predetermined glass sheet section, in which the cutting lines for the glass pane to be cut away are placed sufficiently closely to the fault-containing glass sheet regions so that the widths $B_S$ of the glass sheet regions to be discarded are minimized while providing a largest possible number of usable glass panes.

Preferably the apparatus has a main line and a branch line and the glass pane cutting device is arranged in the branch line. The branch line branches or splits off from the main line downstream from the edge control device, preferably at right angles from the main line.

The division of the apparatus into a main line and a branch line has the advantage that the unchanged remaining crosscut pieces can be further conveyed on the main line and can then already be packaged, while the remaining crosscut pieces can be cut into smaller sized glass panes in the branch line. The branch line has the further advantage that the crosscut pieces for the cutting process need not be rotated, because they have the correct orientation for the cutting devices when they are guided to the branch line.

Preferably an edge control device is arranged after the border trimming station, which is connected with the cutting optimization device. The data from the edge control device are thus transferred to the cutting optimization device, which can perform a post-optimization in the case of edge faults. When—as has already been explained in connection with the method according to the invention—already several further optimized cutting patterns have been calculated, a correctly fitting optimized cutting pattern can be selected from the previously calculated further optimized cutting patterns according to the measured edge faults.

Preferably a thickness-measuring device is arranged in the main line. The thickness profile is measured online with this thickness-measuring device, in order to determine the good glass region widths. The thickness-measuring device is preferably connected to the cutting optimization device in this case.

BRIEF DESCRIPTION OF THE DRAWING

The objects, features and advantages of the invention will now be described in more detail with the aid of the following description of the preferred embodiments, with reference to the accompanying figures in which:

FIG. 2a to 2c are three crosscut pieces with defect- or fault-containing glass sheet regions and cutting patterns according to the state of the art;

FIG. 3a to 3c are three crosscut pieces with defect- or fault-containing glass sheet regions, as shown in FIGS. 2a to 2c, and cutting patterns according to the invention;

DETAILED DESCRIPTION OF THE INVENTION

Figure 1:
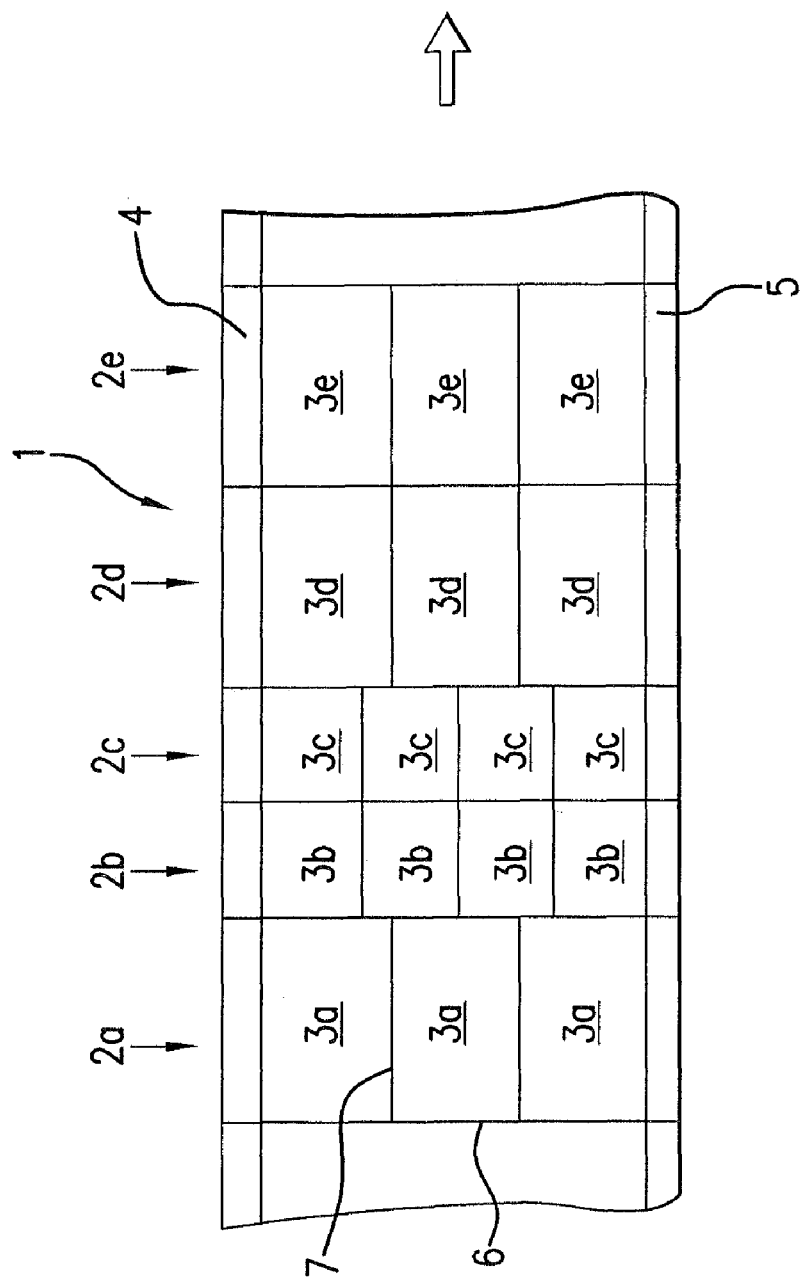
FIG. 1 is a plan view of a glass sheet with a cutting pattern covering its surface.

In FIG. 1 a continuously produced glass sheet 1 is shown, which is provided with a surface-covering cutting pattern. The cutting pattern is a plan for cutting different-sized glass panes 3a-3e. Each of the respective different-sized glass panes 3a-3e are arranged next to each other within one of the corresponding crosscut pieces 2a-2e. The cutting lines 6 extend between the individual crosscut pieces 2a-2e. The cutting lines 7 extend between the individual glass panes 3a-3e of an individual crosscut piece 2a-2e. The glass sheet 1 has a left border 4 and a right border 5, relative to the feed direction shown with the arrow. This sort of surface covering cutting pattern is suitable only for a fault-free glass sheet 1.

Each crosscut piece 2 shown in FIGS. 2a-2c is provided with three glass panes 3a-3c. The individual FIGS. 2a-2c have faults shown at different fault locations.

The glass fault 10 is located in the center pane 3b in FIG. 2a, which must be sorted out or removed after cutting away according to the state of the art.

In FIG. 3a the optimized cutting pattern according to the invention corresponding to FIG. 2a is shown. In the cutting pattern according to FIG. 3a the cutting lines 7 are moved as close as possible to the glass sheet region 14 that should be discarded. Two additional glass sheet regions 13 and 15 arise in the border regions next to the edges of the glass sheet region. The sum of the widths $B_S$ of the glass sheet regions 13, 14 and 15 to be discarded corresponds to the width $B_S$ of the center pane 3b from FIG. 2a. Thus there is no disadvantage to the cutting pattern according to the invention in FIG. 3a in comparison to the conventional cutting pattern according to FIG. 2a. In the case of both FIGS. 2a and 3a two usable glass panes 3a, 3c or 3a, 3b are produced.

In this case, as in all the following examples, each of the glass sheet regions 13-15 must have at least a minimum width $B_R$, so that the glass strip can be cut away without breaking and damage to the borders of the glass panes.

Another example of the cutting method of the prior art is shown in FIG. 2b. The two glass faults 10 and 11 are indicated in the edge regions, which lead to the loss of both glass panes 3a and 3c with an inflexible cutting pattern.

According to the inventive cutting method shown in FIG. 3b the corresponding glass sheet regions 13 and 15 to be discarded are minimized in regard to their widths $B_S$. The cutting lines 7 are moved as close as possible to the glass faults 10,11. Because of that it is possible to produce two glass panes 3a and 3b, so that the yield is doubled here.

In FIG. 2c several glass faults 10, 11, 12 and 12' are distributed over the crosscut piece 2 so that generally no usable pane remains.

According to FIG. 3c a cutting optimization is performed in the above-described manner so that a usable glass pane 3a is obtained.

Figure 4:
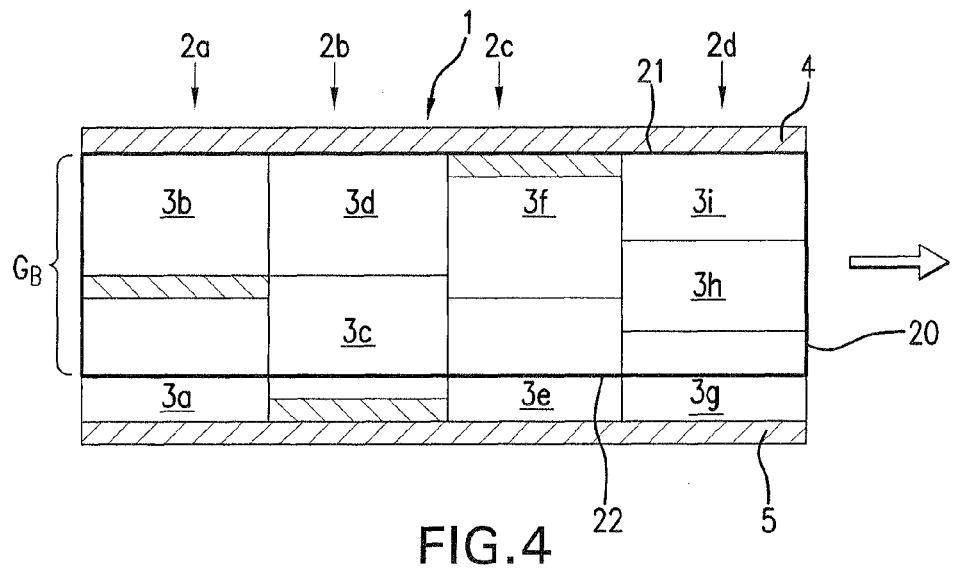
FIG. 4 is a top plan view of a glass sheet with a cutting pattern made without considering the good glass region.
Figure 5:
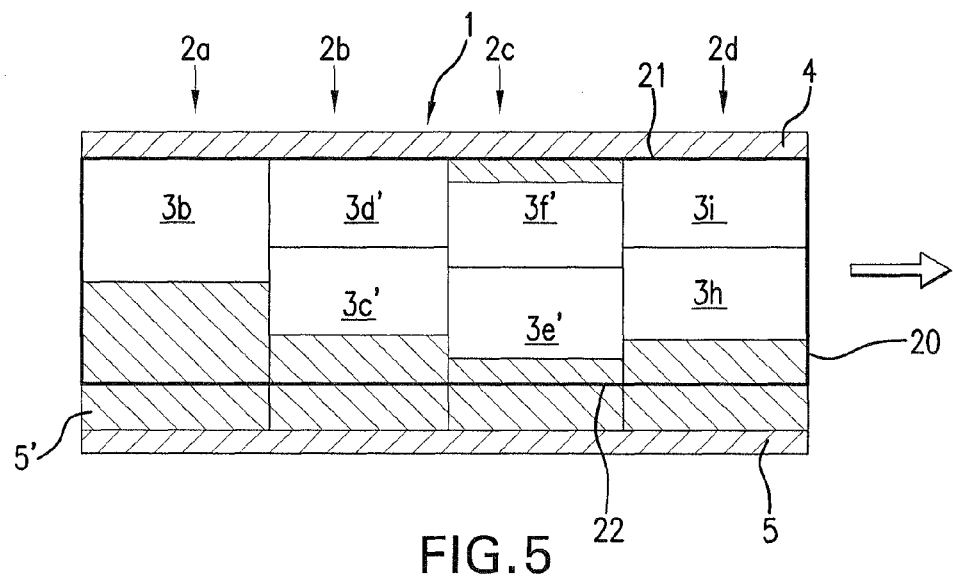
FIG. 5 is a top plan view of a glass sheet with a cutting pattern made considering the good glass region.

In FIG. 4 an optimized cutting pattern is illustrated for glass panes 3a-3i of different sizes. The actually usable glass region $G_B$ can be smaller than the region between the borders 4 and 5 because of an additional thickness profile measurement. This so-called good glass region 20, whose left edge 21 is at the border 4 and whose right edge 22 is spaced from the border 5, requires a modified cutting pattern. Taking the good glass region 20 into account in the cutting optimization leads to the cutting pattern shown in FIG. 5. The maintaining of the size of the glass pane 3b in the crosscut piece 2a leads to loss of the glass pane 3a. In the crosscut piece 2b transition to smaller sizes takes place so that two glass panes 3c' and 3d' can be obtained. The same goes for the crosscut piece 2c. Only glass panes 3h and 3i could be obtained from the crosscut piece 2d. This leads to an additional border 5' at the right edge, which must be additionally cut away from the individual cross pieces 2a-2d.

Figure 6:
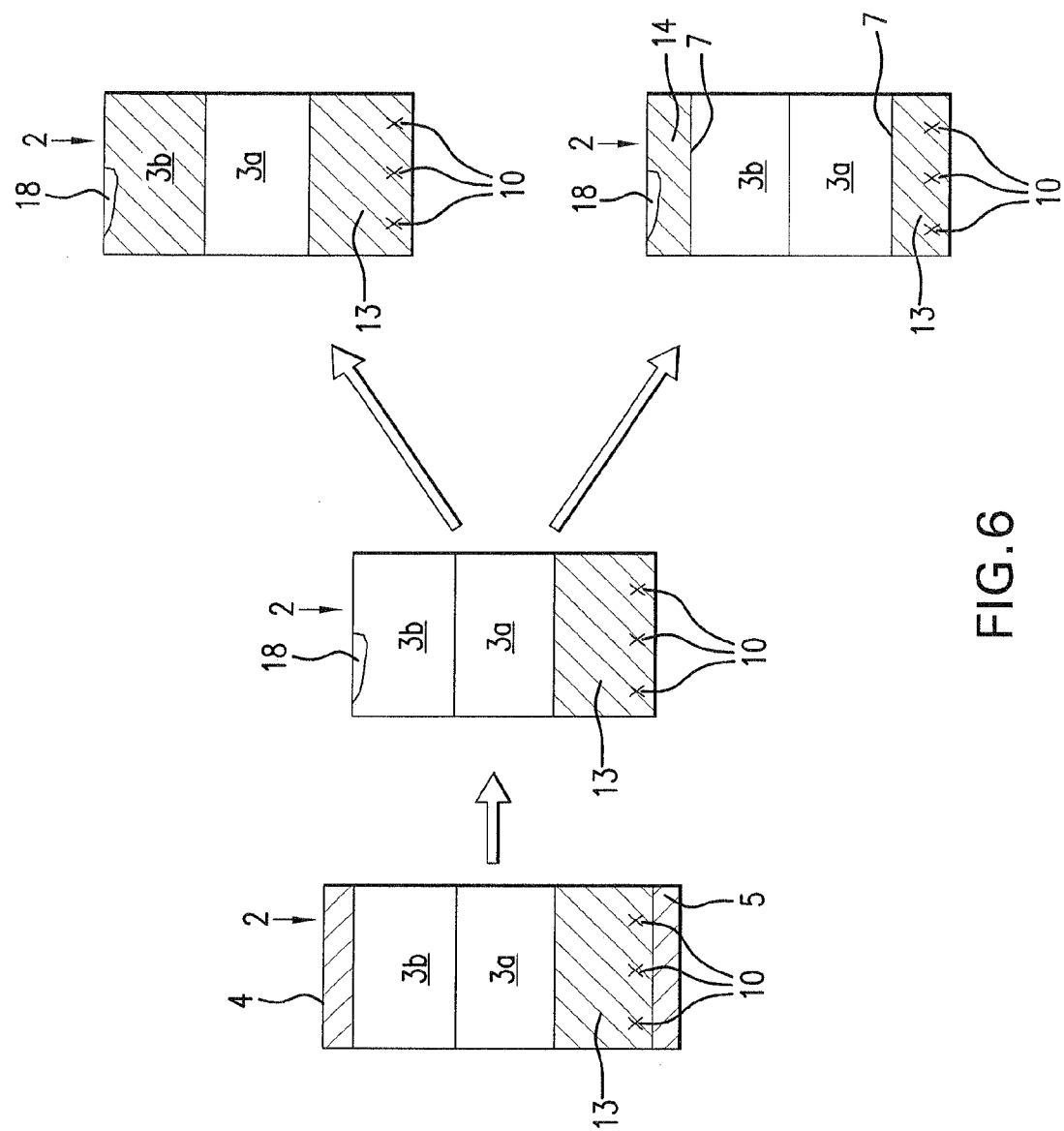
FIG. 6 is a schematic illustration of further optimization of border trimming of the crosscut pieces.

In FIG. 6 a crosscut piece 2 is shown, which has two glass panes 3a,3b and a fault-containing glass sheet region 13, in which three glass faults 10 are located. After cutting away the borders 4 and 5 a border fault 18 is produced in the glass pane 3b, which leads to loss of the glass pane 3b with an inflexible cutting pattern. When a post-optimization according to the invention is performed, two glass panes 3a, 3b can be obtained in an already determined further optimized cutting pattern in which none of the cutting lines is in a border region. In this case two fault-containing glass sheet regions 13 and 14 to be discarded are located on both sides of these glass panes 3a, 3b. Because of the post-optimization it is thus possible to take into account damage or breakage due to cutting off borders and to further optimize the product yield.

Figure 7:
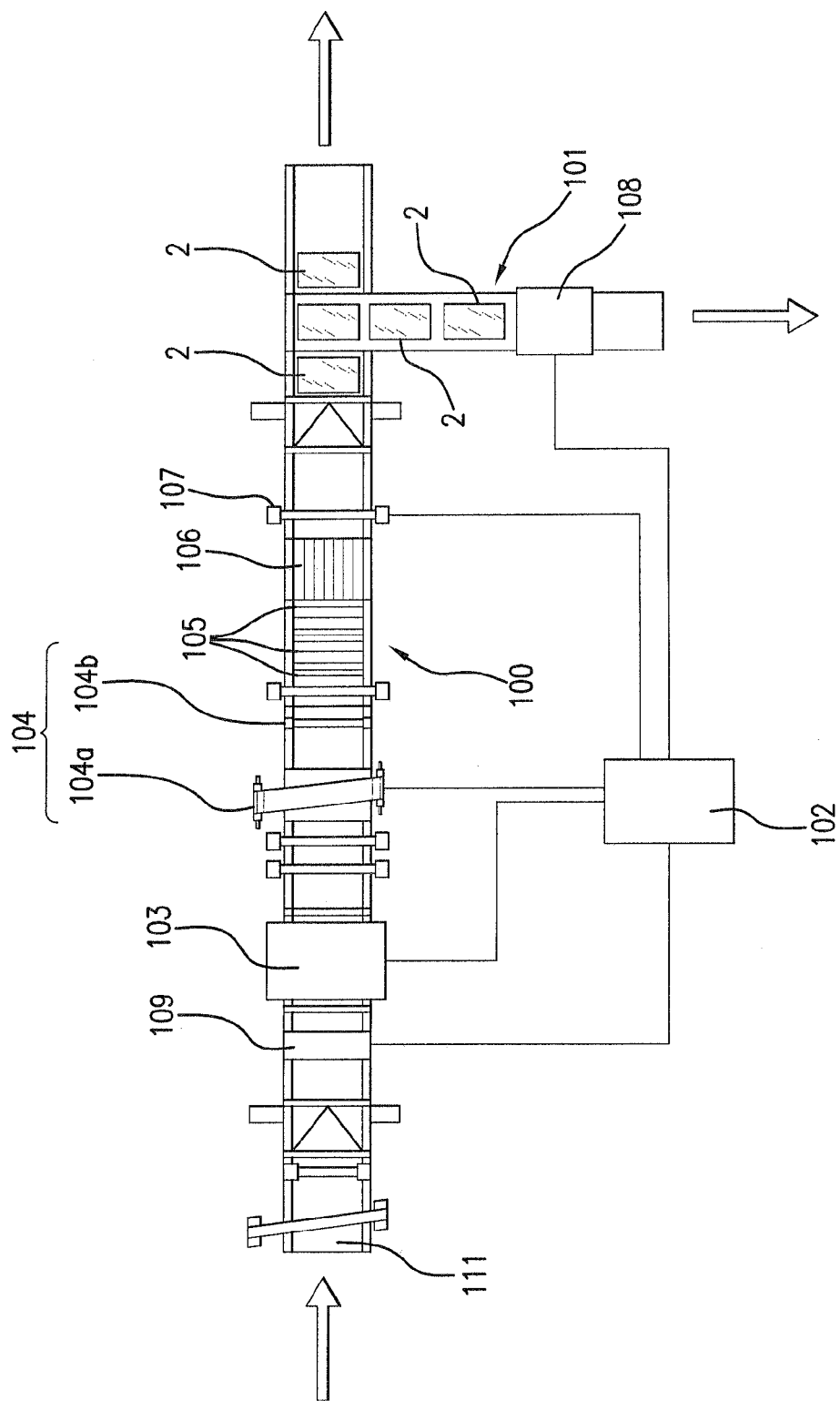
FIG. 7 is a schematic illustration of an apparatus for cutting away glass panes from a continuously produced glass sheet according to the invention.

The apparatus for cutting off glass panes from a continuously produced glass sheet is shown in FIG. 7. The apparatus comprises a main line 100 and a branch line 101. A conveying apparatus 111 for conveying a continuously produced glass sheet extends over the entire main line 100. The cut-off crosscut pieces 2 are transported from left to right in FIG. 7 on the conveying apparatus 111. The glass sheet 1 is tested for glass faults in a fault-detecting device 103. A thickness-measuring device 109 can be provided upstream of the fault-detecting device 103, in order to determine the thickness profile for the good glass region. For this purpose the thickness-measuring device 109 similarly is connected to a cutting optimization device 102.

The data regarding the detected glass sheet regions, which can include faults, are transmitted or input to the cutting optimization device 102 from the fault-detecting device 103. The cutting optimization device 102 is connected with the crosscutting device 104 (crosscutting bridge 104a and breaking roller 104b) and with the glass pane cutting unit 108 in the branch line 101. The cut-away crosscut pieces 2 are moved apart from each other in an accelerating section 105 downstream of the breaking roller 104b. The edge portions of the crosscut pieces 2 are removed in a subsequent or following border trimming station 106. The edges of the crosscut piece are tested for edge faults in the following edge control device 107. Those crosscut pieces 2, whose dimensions correspond to the predetermined desired glass pane size, are conveyed to the end of the main line 100 and packaged. Those crosscut pieces 2, which should be cut into smaller-sized pieces, are conveyed onto the branch line 101 and fed to the glass pane cutting unit 108 there. In this process the crosscut pieces are not rotated so that their wide sides are oriented parallel to the feed direction in the branch line 101. This has the advantage that the crosscut pieces 2 are already oriented in the correct manner for the glass pane cutting device 108.

The cutting optimization device 102 determines an optimum cutting pattern based on the faults found in the fault-detecting device 103. After that the glass panes on the branch line 101 are cut in the glass pane cutting device 108. The cutting optimization device 102 is also connected to the edge control device 107, which is arranged downstream of the border trimming station 106 in the main line 100. If an edge fault 18 should occur during border breaking or trimming, a fault signal is transmitted to the cutting optimization device 102. The cutting optimization device 102 performs a post-optimization of the cutting pattern prior to further cutting and transmits the appropriate information to the glass pane cutting unit 108, where the glass panes are subsequently cut according to the post-optimized cutting pattern. It is also possible to put possible cutting patterns for the post-optimization in the control unit of the glass pane cutting unit 108.

The disclosure in German Patent Application 103 35 247.3-45 of Aug. 1, 2003 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method and apparatus for cutting off glass panes, especially rectangular glass panes, from a continuously generated glass sheet, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of cutting glass panes from a continuously produced glass sheet, said method comprising the steps of:
   a) continuously detecting the glass sheet to determine locations of glass faults in a predetermined section of the glass sheet;
   b) measuring a thickness profile across said glass sheet to determine a glass region of the predetermined section from which glass panes with an acceptable thickness are to be cut;
   c) determining an optimized cutting pattern for the glass region of the predetermined section from the locations of the glass faults and the thickness profile obtained from step a) and step b) by using a cutting optimization device, said optimized cutting pattern comprising a plan for cutting crosscut pieces from the glass region of the predetermined section with the acceptable thickness and for cutting away said glass panes of respective predetermined sizes arranged next to each other in corresponding ones of said crosscut pieces, so that cutting lines for said glass panes in each of said crosscut pieces are placed sufficiently close to said glass faults, so that widths of glass sheet strips containing said glass faults to be discarded are minimized while producing a greatest possible number of usable glass panes without breakage of said crosscut pieces;

d) cutting said crosscut pieces from said predetermined section of the glass sheet according to the optimized cutting pattern;

e) trimming borders away from the crosscut pieces according to the optimized cutting pattern so that said glass panes are only cut from the glass region of the predetermined section with the acceptable thickness;

f) detecting edge faults in said crosscut pieces after trimming said borders in step e);

g) determining a further optimized cutting pattern according to the edge faults detected in step f); and h) cutting said glass panes from said crosscut pieces according to said further optimized cutting pattern.

* * * * *